United States Patent
Wilby et al.

(10) Patent No.: US 10,488,203 B2
(45) Date of Patent: Nov. 26, 2019

(54) COHERENCE MAP NAVIGATIONAL SYSTEM FOR AUTONOMOUS VEHICLE

(71) Applicant: Raytheon Company, Waltham, MA (US)

(72) Inventors: Andrew Wilby, Portsmouth, RI (US); Steven Borchardt, Vienna, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/778,586

(22) PCT Filed: Oct. 17, 2016

(86) PCT No.: PCT/US2016/057426
§ 371 (c)(1),
(2) Date: May 23, 2018

(87) PCT Pub. No.: WO2017/095539
PCT Pub. Date: Jun. 8, 2017

(65) Prior Publication Data
US 2018/0356234 A1 Dec. 13, 2018

Related U.S. Application Data

(60) Provisional application No. 62/261,197, filed on Nov. 30, 2015.

(51) Int. Cl.
*G01C 21/20* (2006.01)
*G05D 1/06* (2006.01)
(Continued)

(52) U.S. Cl.
CPC ............ *G01C 21/20* (2013.01); *B63G 8/001* (2013.01); *B63G 8/14* (2013.01); *G01S 13/90* (2013.01);
(Continued)

(58) Field of Classification Search
CPC .................. G01C 21/20; G06T 7/248; G06T 2207/30241; G06T 2207/10032;
(Continued)

(56) References Cited

U.S. PATENT DOCUMENTS

| 8,346,415 B1 * | 1/2013 | Hinnant, Jr. ......... | G05D 1/0692 701/21 |
| 8,654,610 B2 * | 2/2014 | Megdal ................ | G01S 5/0045 367/117 |

(Continued)

FOREIGN PATENT DOCUMENTS

| CN | 103620442 A * | 3/2014 | ........... G01S 15/025 |
| CN | 102829777 B * | 9/2015 | |

(Continued)

OTHER PUBLICATIONS

Rikoski et al., Holographic Navigation, IEEE International Conference on Robotics and Automation, May 19, 2008, pp. 73-80, IEEE, Pasadena, CA.

(Continued)

*Primary Examiner* — Rodney A Butler (57) ABSTRACT

A method and system for facilitating navigation of an autonomous underwater vehicle (AUV) about an egress path that mirrors an ingress path. Complex return data during an ingress cycle are obtained and a corresponding complex image of the seabed along the ingress cycle is generated. Complex return data during an egress cycle are also obtained and a plurality of corresponding complex local images of the seabed along the egress cycle can be generated. The complex local images are compared to the complex ingress image to identify a normalized cross-correlation coefficient (NCCC). A maximum NCCC indicates that a position of the AUV in the along-track direction has been found. Successive local complex images from the egress cycle can be compared against the complex image from the ingress cycle (Continued)

as the AUV moves along the egress path to identify successive NCCCs, and monitored overtime to determine if the successive NCCCs are increasing or decreasing as the AUV moves along the egress path. The path of the AUV can be corrected to mirror the egress path to the ingress path based on the change of the NCCCs as compared to maximum NCCC.

20 Claims, 6 Drawing Sheets

(51) Int. Cl.
| | |
|---|---|
| *B63G 8/00* | (2006.01) |
| *B63G 8/14* | (2006.01) |
| *G01S 13/90* | (2006.01) |
| *G01S 15/89* | (2006.01) |
| *G01S 17/89* | (2006.01) |
| *G06T 7/246* | (2017.01) |

(52) U.S. Cl.
CPC .............. *G01S 15/89* (2013.01); *G01S 17/89* (2013.01); *G05D 1/0692* (2013.01); *G06T 7/248* (2017.01); *B63G 2008/004* (2013.01); *G06T 2207/10032* (2013.01); *G06T 2207/30241* (2013.01); *G06T 2207/30248* (2013.01)

(58) Field of Classification Search
CPC .......................................... G06T 2207/30248; B63G 8/001; B63G 8/14; B63G 2008/004; G01S 13/90; G01S 15/89; G01S 17/89; G05D 1/0692
See application file for complete search history.

(56) References Cited

U.S. PATENT DOCUMENTS

| | | | |
|---|---|---|---|
| 8,868,268 B2* | 10/2014 | Sanders | G05D 1/0692 701/21 |
| 10,116,841 B2* | 10/2018 | Boyle | G06T 3/4038 |
| 2008/0165617 A1* | 7/2008 | Abbot | G01S 11/14 367/3 |
| 2011/0144836 A1* | 6/2011 | Larkin | G05D 1/0692 701/21 |
| 2012/0281503 A1 | 11/2012 | Rikoski | |

FOREIGN PATENT DOCUMENTS

| | | |
|---|---|---|
| JP | 2014519023 A | 8/2014 |
| WO | WO 2015/173034 A1 | 11/2015 |

OTHER PUBLICATIONS

International Search Report for International Application No. PCT/US2016/057426 dated Jan. 24, 2017, 18 pages.
Wakayama et al., Signal Processing for High-resolution Synthetic Aperture Radar, Mitsubishi Denki Giho (Mitsubishi Electrical Technical), 2010, 12 pages, vol. 84, No. 11, Japan.

* cited by examiner

COHERENCE MAP NAVIGATIONAL SYSTEM FOR AUTONOMOUS VEHICLE

RELATED APPLICATIONS

This application claims the benefit of U.S. Provisional Patent Application No. 62/261,197, filed on Nov. 30, 2015, and entitled, "Underwater Navigation for Autonomous Vehicles Using Seabed Coherence Map," which is incorporated by reference herein in its entirety.

BACKGROUND

Autonomous vehicles are increasingly being used in both the underwater and terrestrial (e.g., out-of-water or above-water, on land, aerial, etc.) domains to fulfil tasks previously conducted using manned platforms. No matter the domain, the ability to navigate precisely is a key performance parameter of all autonomous systems.

Underwater autonomy has applications in both commercial and military contexts. For example, underwater scientific research can use underwater vehicles to navigate areas of the ocean floor for a variety of reasons. Unmanned undersea or underwater vehicles (UUVs) are also commonly used in mine warfare to inspect and/or identify mines or other underwater items. Still other example applications for UUVs exist that are not mentioned here. The advantages of UUV technology are multiple, and include economic benefits and the ability to operate in hostile environments without putting personnel at risk.

Many existing autonomous underwater systems utilize inertial navigation systems, combining accelerometer and rate gyroscope measurements with observations of velocity from an acoustic sensor to produce a navigation solution. Such systems require periodic geographic fix data to reduce the effects of the position drift encountered when noisy sensor data is integrated for long periods of time.

Geographic fixes can be provided by surfacing (to acquire a fix from a GPS satellite network), by identification of some known point on the seabed, or from an acoustic tracking system. Returning to the surface for a GPS fix may not be convenient or desirable if the vehicle is operating in deep or hostile water. Furthermore, fixed land marks may not exist in the area being surveyed, and the requirement to track and follow an undersea vehicle is not consistent with many operational autonomous models.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary examples illustrated, and specific language will be used herein to describe the same. It will nevertheless be understood that no limitation of the scope of the invention is thereby intended.

DETAILED DESCRIPTION

An initial overview of technology examples is provided below and then specific technology examples are described in further detail later. This initial summary is intended to aid readers in understanding the technology more quickly but is not intended to identify key features or essential features of the technology nor is it intended to limit the scope of the claimed subject matter.

Unmanned underwater vehicles ("UUV," also referred to herein as an autonomous underwater vehicle "AUV" or Autonomous vehicles "AV") are increasingly being used in the undersea (or underwater) and terrestrial domains to fulfil tasks previously conducted using manned platforms.

In a terrestrial domain, the presence of a navigational fix from the Global Positioning System (GPS) network can provide a simple, accurate, low cost mechanism for navigation. However, electromagnetic wave dissipation in water renders technologies such as GPS useless for underwater applications.

In an underwater domain, the AUV can use an inertial navigation system to determine the position of the AUV. The drift of the inertial system can be moderated or corrected by acquiring an absolute positional fix from an external reference source; this can be achieved by surfacing to obtain a navigation fix from a global positioning satellite (GPS), or by using another system, such as a long baseline tracking sonar to manage drift. In deep water or on missions where it is undesirable to surface (e.g., deep water or covert missions), navigation drift and efforts to moderate or correct this presents a significant challenge.

In one aspect, bathymetry (e.g., submarine topography) can be used as a mechanism to correct for inertial drift in the navigation system. That is, the AUV can rely on contours of bathymetric surface maps to correct for the drift in the inertial navigation system, either in absolute terms, if a pre-existing topographical model exists, or relatively, using the "breadcrumb trail" of data from an ingress cycle or path to correct for drift during egress. However, terrain comparison becomes ineffective in areas with few or unidentifiable seabed features, or that are substantially devoid of seabed features.

Figure 1:
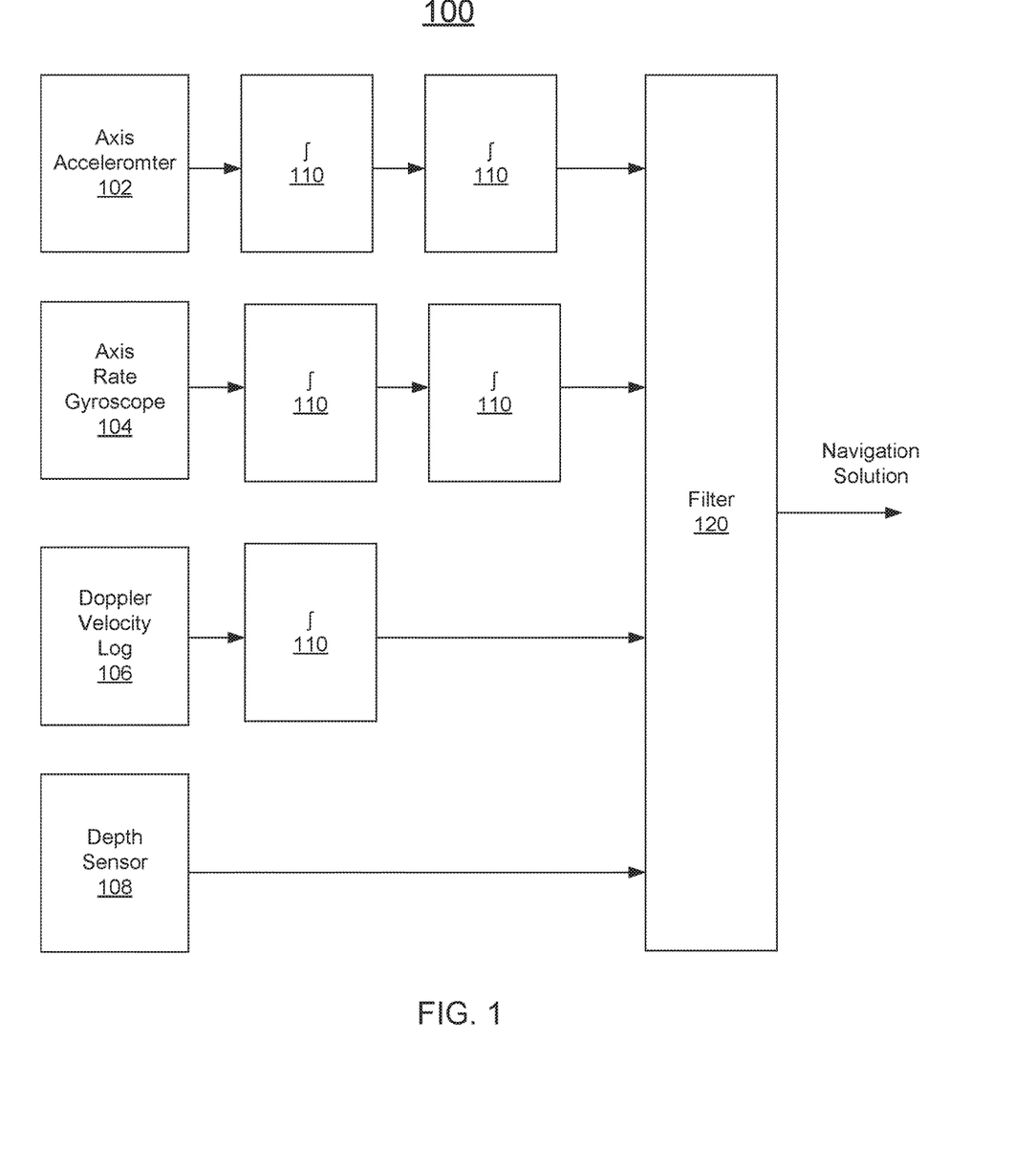
FIG. 1 illustrates a block diagram of an inertial measurement system in accordance with an example of the present disclosure.

FIG. 1 illustrates a block diagram of an inertial measurement system 100 (also known as "inertial navigation system") in accordance with an example of the present disclosure. In one aspect, in the underwater domain, Autonomous Undersea Vehicles, (AUVs) can rely, at least in part, on inertial systems to provide navigation solutions. The inertial measurement system 100 can typically use a number of sensors, such as depth sensor 108, each taking indirect measurements, being combined together in an optimizing filter to produce a coherent solution. In one aspect, the inertial measurement system 100 can consist of an axis accelerometer 102 (e.g., linear accelerometers or motion sensors), three axis rate gyroscopes 104 (e.g., rotation sensors), together with a Doppler Velocity system that can include a velocity log (DVL) 106 to measure the velocity of the AUV across the seabed, and a depth sensor 108 to measure the depth and/or altitude of the AUV.

In one aspect, the inertial measurement system 100 can comprise a self-contained navigation system in which measurements provided by one or more of the accelerometers 102 and the gyroscopes 104 can be used to track the position and orientation of an object (e.g., the AUV) relative to a known starting point, orientation and velocity. Inertial measurement units (IMUs) of the inertial measurement system 100 contain three orthogonal rate-gyroscopes 104 and three orthogonal accelerometers 102, measuring angular velocity and linear acceleration respectively. The inertial measurement system 100 can be initially provided with its position and velocity from another source (a human user, a GPS satellite receiver, etc.), and thereafter can compute its own updated position and velocity by integrating information received from axis accelerometer 102. The advantage of an inertial measurement system 100 is that it requires no external references in order to determine its position, orientation, or velocity once it has been initialized.

In one aspect, the accelerometers 102 can measure linear acceleration of the AUV in the inertial reference frame, but in directions that can only be measured relative to the moving AUV (since the accelerometers are fixed to the system and rotate with the system, but are not aware of their own orientation). The three axis rate gyroscopes 104 can measure the angular velocity of the AUV in the inertial reference frame. By using an original orientation of the system in the inertial reference frame as the initial condition and integrating the angular velocity, the AUV's current orientation is known at all times. By processing signals from the three orthogonal rate-gyroscopes 104 and three orthogonal accelerometers 102 it is possible to track the position and orientation of an AUV.

In one aspect, the measurements taken by the inertial measurement system 100 can be indirect, in that the measurements can be integrated using one or more integrators 110 and filter 120 to produce a position estimate or "navigation solution". Moreover, over time, errors of the inertial measurement system 100 (e.g., errors associated with any sensor, such as the depth sensor 108, accelerometer 102 (e.g., motion sensors), and/or gyroscope 104 (e.g., rotation sensors) can accumulate and cause a drift of the sensor position away from the true position. The rates of drift can depend on the quality of the instrumentation of the inertial measurement system 100, but drifts of the order of a small magnitude, such as less than several tens of meters (m) per hour (h) (e.g., 20 m/h) are not atypical.

However, with an AUV operating for periods of many hours, if not days, it is necessary to provide direct measurement to allow a navigation solution beyond the inertial measurement system 100, to be reset periodically and/or to remove the drift associated with the integration of the inertial measurement system 100, such as noise associated the depth sensor 108, accelerometer 102, and/or gyroscope 104). As such, the AUV can be provided with a direct position fix, either by observation of a known point on an underwater floor (e.g., a seabed fiducial), through surfacing to get a GPS fix, or by an input from a tracking system, which is itself fixed in a geodetic frame.

On the other hand, when operating an AUV in deep water, or covertly (e.g., such as may be the case if in hostile territory), it is not always possible or desirable for an AUV to return to the surface. For example, when operating in deep water, returning to the surface may not be desirable since returning to the surface for a position fix and then diving back down to a selected depth can take several hours and can consume a significant amount of energy and resources, and thus may not be economically feasible. In examples where the AUV is to operate covertly, returning to the surface will expose the AUV, thus increasing the chance that the AUV will be detected. In addition, an AUV, which has returned to the surface, can be subject to wave action and/or potential damage through collisions with one or more aquatic vessels, such as a shipping vessel. In addition to these considerations, the Doppler Velocity log (DVL) systems (e.g., DVL 106) used on an AUV can have a limited range, and so for a majority of an ascent and/or descent cycle, the DVL 106 may not be in contact with the underwater floor (e.g., the ocean floor or "seabed"). This can increase the drift rate associated with the inertial measurement system 100, and in fact, the process of trying to bound the drift of the inertial measurement system 100 can actually degrade the final navigational solution.

In many cases, the drift associated with an inertial measurement system 100 can be tolerable. However, an AUV can be tasked to execute a mission where there is a long ingress cycle, followed by a survey of a large, square area of the seabed, followed by a long egress cycle. In this scenario, the inertial measurement system 100 can allow an area to be surveyed at a remote location, and the drift in the inertial measurement system 100 from one leg of the survey to the next leg of the survey can be sufficiently small to need only a tolerable overlap in the data swaths. In this regard, the AUV can return to the point of origin quite precisely.

However, if an AUV is operating in a GPS denied environment, features of an underwater floor (e.g., ocean floor or seabed) can be used to aid in the re-navigation to the point of origin. In one aspect, the AUV can use topographical features observed during an ingress cycle to produce a map, which can be used during egress, to retrace its path back to origin. For example, this process can be employed where the terrain is sufficiently feature rich to allow an unambiguous map to be created. However, using topographical features observed during the ingress evolution to produce a map process can be insufficient if the seabed is devoid of significant bathymetric features. Unfortunately, much of deep ocean floor or seabed is quite flat and featureless.

With the foregoing in mind, the present technology provides systems and methods for autonomous underwater and other land-based navigation, for example, underwater navigation with an autonomous vehicle (AUV). More specifically, the present technology provides systems and methods that employ a "breadcrumb" strategy without the need for reliance upon specific topography or bathymetry features.

Although the present systems and methods can be deployed in land-based applications/environments, an underwater application/environment in which sonar is used is discussed in detail herein. When a return from a high resolution sonar is received from the seabed, the return acoustic data or reflection is not uniform, but is specular in nature. In other words, the image is dominated by the specular reflections of wavelength and near-wavelength scale facets (i.e., speckle) present in the reflecting surface. The orientation of these facets is such that a near unique return phase structure would be received from any observation position, as the facets which are orthogonal at one observation point are not so when observed from a different vantage point. In "normal" sonar, the presence of speckle is a distraction as it causes significant amplitude returns which obscure from the user the underlying feature of a seabed. However, as employed herein using coherent change detection sonar, this structure in the return from the seabed is used to advantage. While a disturbance to the surface of the seabed may be quite slight, such that it is not detectable in the resultant image, the disturbance to the speckle and the phase structure of the return from the seabed can be discriminated by coherently processing two later in time images and looking for changes in the phase of the return. Indeed, the present technology sets forth systems and methods by which coherent change, or more specifically the aspect dependence of the image coherence, is exploited. Unlike the surface of the ocean, which is in continual motion, the seabed is relatively static, and so, when the seabed is observed from the same position in space, the return reflection will remain constant for significant periods of time The present technology measures the phase structure of the sonar return from the seabed (or other surfaces, such as land surfaces) and compares it to that of a previous observation. This measure of coherence (coherence coefficient) is very high if the observation point is the same as for the previous measurement, and reduces very rapidly as one moves away from the point of original observation. The coherence does not rely on topography, but on the wavelength scale surface roughness present in all surfaces.

In one example, an underwater example, the present technology describes a navigation system and method in which high resolution sonar can be deployed to generate a coherence map based on the ability of the seabed to remain coherent over periods of hours to days. The system further uses the quality of the coherence between a new observation and the previously obtained coherence map as a measure of how well the original ingress path or track is being followed, such as during egress, providing a navigation solution which does not drift over time. These features can be exploited by an AUV to re-track home to base (or another previous location/position), without the need for any external navigational fixes.

Figure 2:
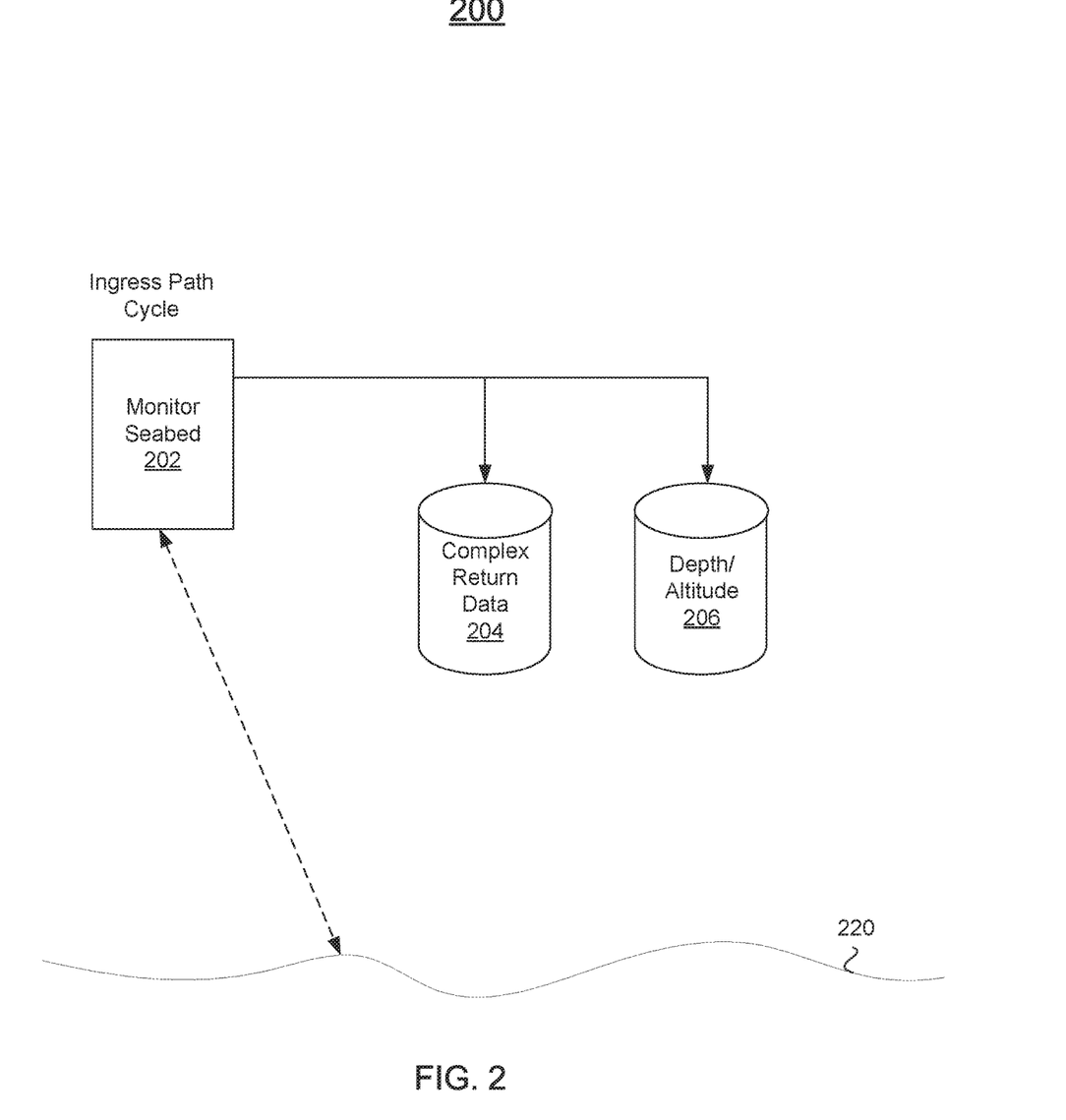
FIG. 2 illustrates a block diagram of monitoring a seabed during an ingress cycle in accordance with an example of the present disclosure.
Figure 5:
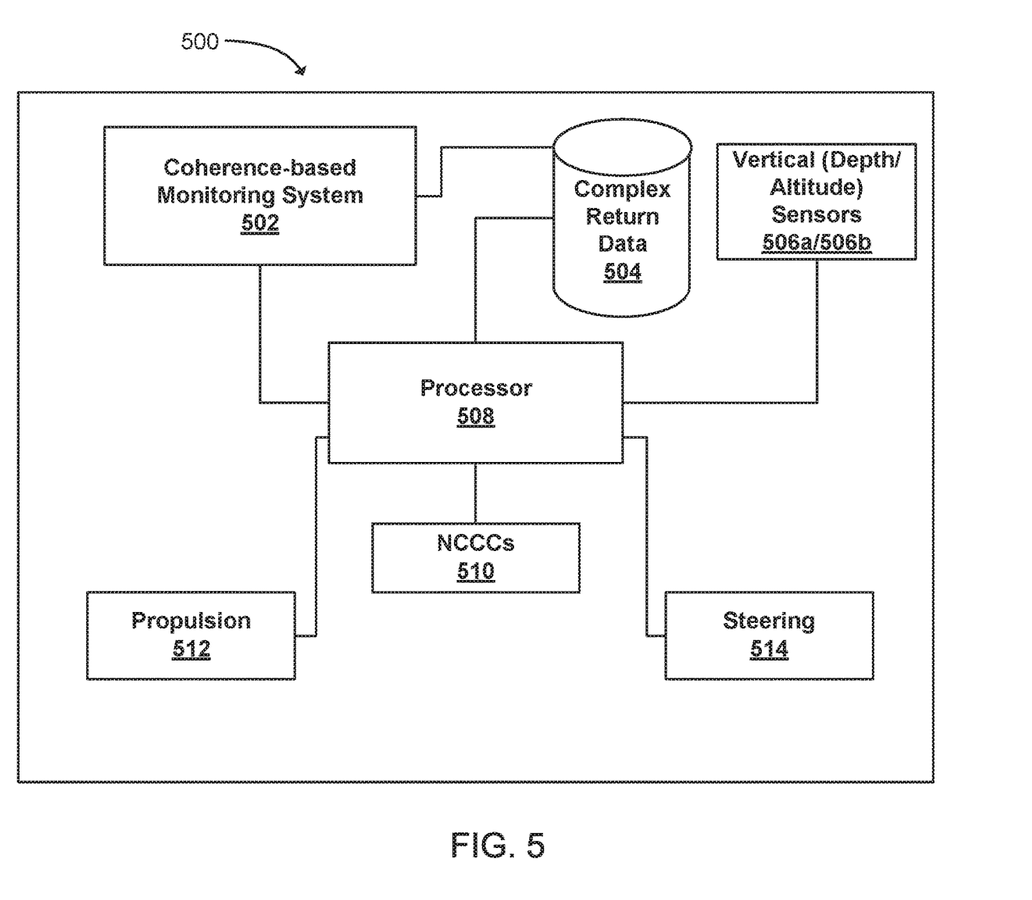
FIG. 5 illustrates a navigation system for an autonomous vehicle in accordance with an example of the present disclosure.

With reference to FIG. 2, illustrated is a block diagram depicting part of the navigational system and method of an AUV, namely during an ingress cycle within an underwater domain. As shown, during the ingress cycle, the navigation system onboard an AUV can monitor a surface topography/bathymetry (e.g., an underwater seabed) during an ingress cycle or path, in accordance with an example of the present disclosure. The navigation system can further monitor or determine the vertical location of the vehicle relative to a ground or ground surface using a sensor capable of measuring the positon/location of the vehicle along a vertical axis (relative to ground, seabed, etc.). In one aspect, direct measurement of the depth of the AUV, using a vertical axis sensor in the form of a pressure or other sensor, can provide an accurate estimate of vehicle depth. Specific types of depth sensors are not discussed herein, but are known to those skilled in the art. This depth data can be collected and stored for later use (206) by the navigation system of the AUV to assist in maintaining a depth of the AUV during an egress cycle, as discussed below. Direct measurement of vehicle altitude can further be obtained from a depth sounder.

To facilitate navigation during the egress cycle, the AUV navigation system can further comprise a coherence-based monitoring system (see FIG. 5) operable to monitor a surface topography/bathymetry and transmit a signal, and to receive a return signal. The monitoring system can further be configured to generate complex images based on the surface topography or bathymetry, in this case a seabed. For example, the monitoring system can comprise a sensor system that is deployable and/or actuatable to transmit a signal and to receive a return signal. In an underwater environment, the sensor system can comprise a sonar system having a sonar transmitter and receiver capable of transmitting an acoustic signal, and receiving the resultant return sound waves or signals directed or reflected off of the seabed 220 (the return signal data). The sonar system can be operably in communication with a processor and data store of the navigation system that is capable of receiving, storing and processing the sonar return signal data, and generating the complex images. For example, during an ingress cycle or path, the seabed 220 can be monitored 202, and complex seabed data, namely complex coherent sonar return data (e.g. data providing both the magnitude and phase of the seabed return data) can be gathered or collected and stored (204). As the complex coherent sonar return data is gathered, one or more complex images (or complex ingress images) can be generated that correspond to the sonar return data (discussed in more detail below), the complex image(s) being representative, at least in part, of the ingress path or cycle.

Figure 3:
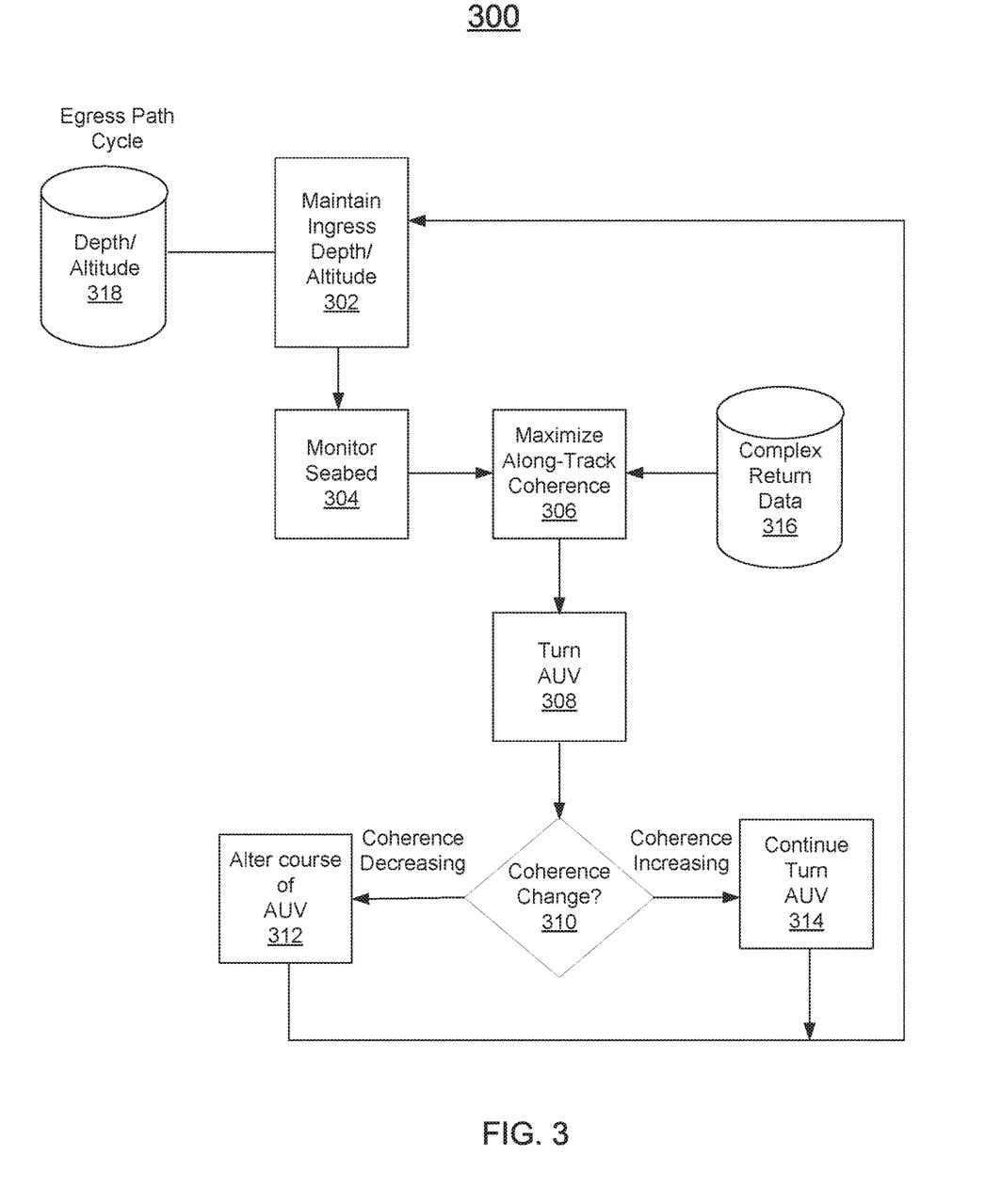
FIG. 3 illustrates a block diagram of an underwater navigation sequence for an autonomous vehicle (AUV) during an egress cycle in accordance with an example of the present disclosure.

Turning now to FIG. 3, illustrated is a flow diagram 300 of an underwater navigation process for an autonomous vehicle (AUV) during an egress cycle or path, in accordance with an example of the present disclosure, which again facilitates in navigation of the AUV in the above-identified third dimension. During the egress path, as part of its navigation solution, the AUV can utilize the depth data 318 (depth/altitude) previously gathered and/or stored during the ingress cycle or path (e.g., see description above, and FIG. 2) using the depth sensor to maintain (302) the same operational depth (and the depth sounder to maintain altitude), compensating for any difference in tide heights between the two mission cycles. In other words, the AUV can continue direct measurement of the depth/altitude of the AUV, using the pressure or other suitable depth sensor, to provide an accurate estimate of vehicle depth. This current depth data can be compared to the previously obtained depth data 318 to keep the AUV at the same operational depth during the egress cycle as it was during the ingress cycle. Given that the AUV has knowledge of its altitude/depth during ingress, the AUV is able to maintain the same altitude/depth during its egress cycle, without recourse to vehicle sensors.

In addition, just as during the ingress cycle discussed above, during the egress cycle, the AUV can monitor 304 the seabed and can gather coherent sonar return data. Specifically, during the egress cycle, the AUV can continue to monitor 304 the seabed to create a plurality of complex images of the seabed, based on or corresponding to the coherent sonar return data received in block 304.

A most recent or current complex image from the egress cycle (hereinafter called the local image or complex local image), as an example the last 50ft of distance travelled by the AUV, can be correlated against the entire complex image created during the ingress cycle (the complex ingress image being later used as a reference image during an egress cycle). During this process, the normalized cross-correlation coefficient (NCCC) is identified or obtained and monitored as the local image from the egress is compared against each portion of the ingress image. In one aspect, coherent change detection (CCD) can be used for the detection of both amplitude and phase changes defined between image pairs (i.e. images of the same scene taken at different times, such as during an ingress cycle and an egress cycle). CCD has an advantage of detecting changes that can otherwise remain undetected using incoherent techniques. That is, CCD can exploit changes in both the amplitude and phase content.

CCD can rely on an image generation process being coherent, wherein each pixel of the image contains amplitude and a phase, or alternatively a real and imaginary value. As the phase is measured in fractions of a wavelength of the carrier signal, CCD can detect very subtle scene changes that can remain undetected using incoherent techniques.

Once the NCCC is obtained by calculating or measuring the change in phase of the reflectivity of the seabed as compared between a local complex image and the complex image from the ingress cycle, this process is repeated over time and as often as needed along an egress path of the AUV. At the point that a maximum is observed in the NCCC, the position of the AUV in the along-track direction has been found. This maximizing of the along-track coherence is shown at block 306.

This process determines the position of the vehicle in the along-track direction, but not in the across-track dimensions. Because the vehicle may not be exactly in the same position as it was during the ingress cycle, and for reasons of noise, the NCCC can be less than 1 (e.g., the NCCC can deviate from maximum NCCC), thus indicating that the egress path of the AUV does not match the ingress cycle. In this case, successive calculated NCCCs can be identified and monitored for new and successive local complex images as the AUV moves forward along the egress path or track. As the AUV is driven, the vehicle path is altered, by making a slight turn (308) to test if the vehicle is getting closer or farther away from the ingress path. An increasing level in the NCCC indicates that the egress path of the AUV is getting nearer to or converging on the ingress path towards a maximum NCCC. An increasing NCCC will indicate that the current egress path of the AUV is to be maintained, or a current turn continued (at block 314). On the other hand, a decreasing NCCC indicates that the egress path is diverging away from the ingress path and a maximum NCCC, and one or more course corrections are needed (e.g., course reversed) (block 312) to once again achieve an increase in the NCCC and to maintain the AUV on an egress path that approximates the ingress path as closely as possible (e.g., turn the AUV in a direction to stop the decreasing NCCC level and instead achieve an increasing NCCC level). In essence, by monitoring the NCCCs based on successive local images as compared to the complex ingress image, and by making corresponding course corrections, the AUV continuously attempts to "search" for the ingress path, thus trying to optimize the result by changing course slightly from the ingress bearing, effectively drifting across the known ingress path to try and find a maximum in the NCCC.

Via the onboard navigation system (see FIG. 5), which can further comprise a propulsion system for providing propulsion power to the AUV vehicle, and a steering system for providing directional (e.g., pitch, yaw, roll capabilities) maneuvering of the AUV vehicle, the AUV can be directed to make various course corrections (e.g., sway along the track) in order to cause the egress path to match the ingress path as closely as possible. As various course corrections are implemented, the AUV can be directed to sway back and forth across the ingress path as it travels along (308) to allow an assessment of whether successive NCCCs are increasing or decreasing. As the AUV moves, new local images can be created and new NCCCs can be calculated representative of different positons of the AUV along the egress path. Successive NCCCs can be calculated at any positon relative to a prior positon of the AUV. For example, but not intending to be limiting in any way, these can be calculated at successive 50 ft. increments.

Using the new local images and calculated NCCCs, the navigation system can monitor whether the level of the NCCC is increasing or decreasing for subsequent local images. If the NCCC is decreasing, the AUV knows that it is getting further away from the ingress path and should alter its course (e.g., reverse the direction of sway). If the NCCC is increasing, the AUV can continue to in the same direction (e.g., continue to sway in the same direction), this being an indication that the error in along-track deviation between the ingress and egress paths is decreasing.

Making course corrections, such as reversing direction (e.g., port and/or starboard), always looking for the maximum normalized cross-correlation coefficient, enables the AUV to remain on track (closely matched with the ingress path or track) during egress by continuously comparing the egress local images to the reference ingress images of the seabed.

Essentially, the systems and methods described herein utilize a self-generated coherence map to provide the AUV with a re-navigation solution, wherein the re-navigation relies on local coherence, rather than the presence of topographical features. This system is particularly effective and useful in areas where the seabed is devoid of features as specific seabed features are not needed or required. Indeed, sediment coherence relies on observation of the detailed structure of the seabed rather than on large features. Coherence is specific to a scene and the observational viewpoint, but it doesn't need large topography to be useful, particularly as the coherence of the seabed is typically maintained for several hours to several days. As coherence is lost quickly as the observation point (e.g., the observation point at which the local image is compared to the complex ingress image) is altered, the AUV can be successfully navigated through three-dimensional space along a previously navigated route by monitoring the NCCCs.

The AUV navigational system, as described herein, enables an AUV to exploit the specular properties of the return signal, that is that the specular structure alters as a function of the point of observation, to create a navigation solution based on the premise of establishing and maintaining maximum coherence (e.g., a maximum normalized cross-correlation coefficient), with data gathered along a previously navigated route. The AUV navigational system provides precise re-navigation through 3-dimensional (3D) space, without the need for external navigational fixes, either to return home, to hold position, and/or to copy a mission or path which was conducted at an earlier time, and without a conventional source of navigation. The AUV navigational system further reduces the AUV vulnerability to detection and attack as the AUV is able to maintain a positional fix without the need to surface, even if other sensors are compromised or unable to be used.

Figure 4:
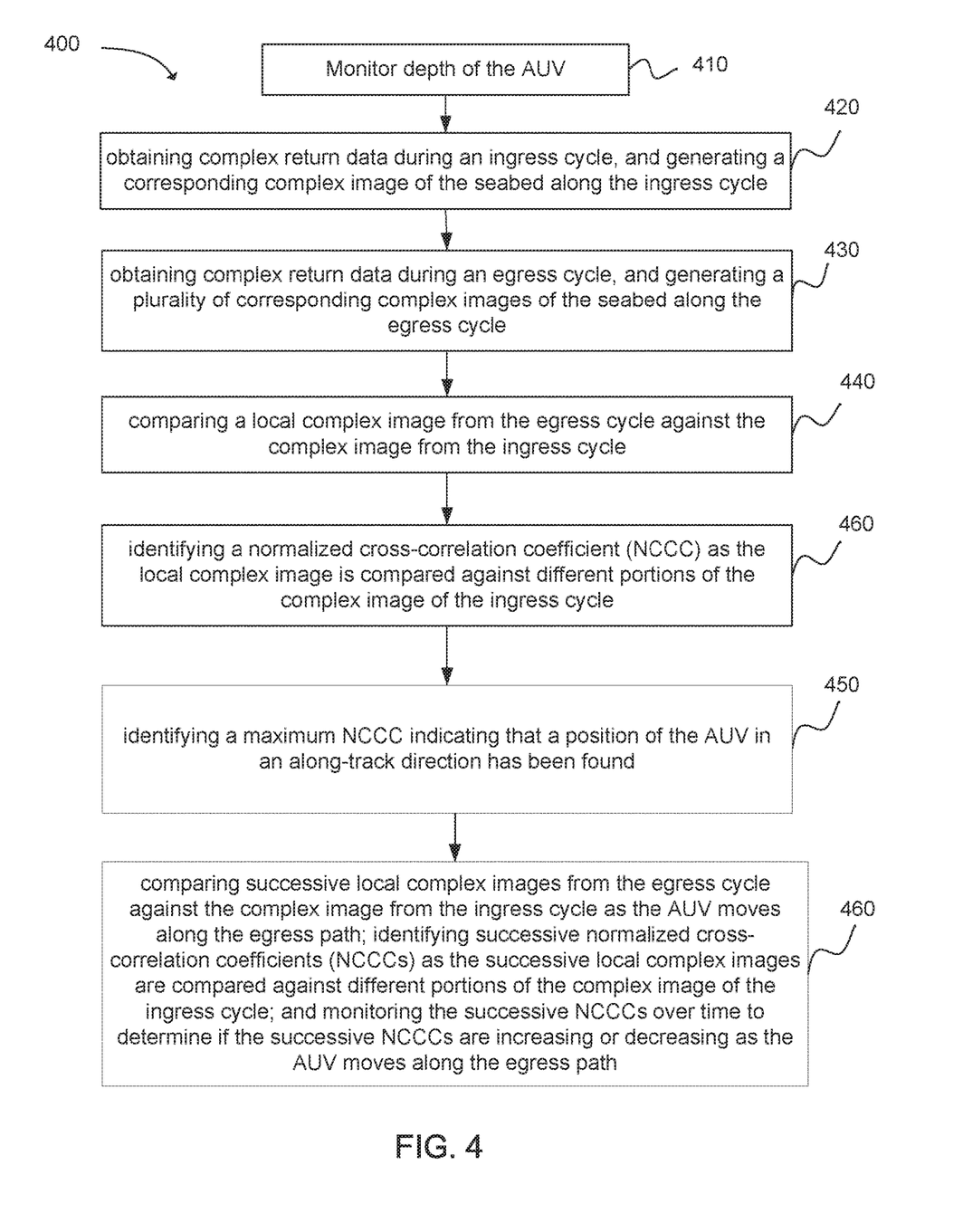
FIG. 4 illustrates a flow diagram of an underwater navigation method in accordance with an example of the present disclosure.

FIG. 4 illustrates a flowchart of an example method 400 for an underwater navigation system according to an example of the present technology. The functionality 400 can be implemented as a method and executed as instructions on a machine or computing device (e.g., a computer, sonar device, a camera device, a navigation system/device etc.), where the instructions are included on at least one computer readable medium or one non-transitory machine-readable storage medium. For example, and with reference to the systems discussed above, starting in block 410, the depth of the AUV can be monitored, as discussed above (both during an ingress cycle and an egress cycle) to maintain the AUV at the same or substantially the same depth during both the ingress cycle and the egress cycle, if desired. At block 420, the method can comprise obtaining complex return data during an ingress cycle, and generating a corresponding complex image of the seabed along the ingress cycle. The step of generating can comprise generating one or a plurality of complex images of the seabed along the ingress cycle. At block 430, the method can comprise obtaining complex return data during an egress cycle, and generating a plurality of corresponding complex images of the seabed along the egress cycle. At block 440, the method can comprise comparing a local complex image from the egress cycle against the complex image from the ingress cycle. At block 450, the method can comprise identifying a normalized cross-correlation coefficient (NCCC) as the local complex image is compared against different portions of the complex image of the ingress cycle. At block 460, the method can comprise identifying a maximum NCCC indicating that a position of the AUV in an along-track direction has been found. At block 470, the method can comprise, over time, comparing successive local complex images from the egress cycle against the complex image from the ingress cycle as the AUV moves along the egress path; identifying successive normalized cross-correlation coefficients (NCCCs) as the successive local complex images are compared against different portions of the complex image of the ingress cycle; and monitoring the successive NCCCs over time to determine if the successive NCCCs are increasing or decreasing as the AUV moves along the egress path. An increasing level in the NCCCs indicates that the egress path of the AUV is converging on the ingress path, and a decreasing level in the NCCCs indicates that the egress path of the AUV is diverging from the ingress path. Based on the monitoring of the NCCCs, various corrections in the path of the AUV along the egress cycle can be corrected in an effort to always be searching for and to maintain a maximum NCCC.

Those skilled in the art will recognize, and the present disclosure contemplates, implementations using the above-described systems and methods in non-water or land/surface applications. For example, the systems and methods described above may be carried out using various other technologies and sensor types/systems within a coherence-based monitoring system, such as, for example, laser, radar, and/or sonar technologies for determining a precise location and for navigation of an object above or out of the water (e.g., on land). Using these other types of sensor systems/types, the navigation solutions discussed above employing a coherence-based monitoring system, in which ingress and egress complex images are obtained and compared, and successive NCCCs calculated and monitored for increasing or decreasing trends relative to maximum NCCC are applicable and contemplated for use in providing suitable navigation solutions for land-based, aerial and other vehicles. In addition, it is contemplated that these solutions can be utilized with other commonly known vertical axis sensors used to identify the vertical location or positon of the vehicle relative to ground or a ground surface (e.g., altimeter, etc.). These solutions may be effective and beneficial should other navigational solutions, such as GPS-based navigation solutions become inoperable or unavailable for one or more reasons.

FIG. 5 illustrates an onboard autonomous vehicle (AUV) navigation system comprising at least vertical sensor, such as a depth sensor 506a for measuring a depth of the vehicle, and/or an altitude sensor 506b for measuring an altitude of the vehicle. The system further comprises a coherence-based monitoring system 502 configured to transmit a signal about a ground surface (e.g., seabed, land, etc.), and to receive a resultant return signal having return data. Operable with the depth sensor 506a, the altitude sensor 506b, and the coherence-based monitoring system 502 is a processor 508 configured to receive the data from these. The processor can further be configured to receive the return data from the coherence-based monitoring system, and to generate one or more corresponding complex images, wherein the complex images comprise a complex ingress image from an ingress cycle, and at least one complex local image from an egress cycle. The processor can further be configured to compare successive complex local images from the egress cycle to the complex ingress image. The system can further comprise a plurality of normalized cross-correlation coefficients (NCCCs) output by the processor and obtained from successive comparison of the complex local images to the complex ingress image, wherein the plurality of NCCCs comprise one of a decreasing level and an increasing level as compared to a maximum NCCC, the maximum NCCC representing an along-track positon of the AUV. The system can further comprise a propulsion system 512 and a steering system 514 operable to alter an egress path of the AUV in the event of a decreasing level of NCCCs, thereby causing the AUV to re-navigate about an ingress path taking during the ingress cycle.

In one example, the coherence-based monitoring system can comprises a sonar system having a sonar transmitter for transmitting the signal as an acoustic sonar signal, and a receiver for receiving the return signal as an acoustic sonar return signal. In other examples, such as those used in land-based environments rather than underwater, the coherence-based monitoring system can comprise a radar system, a laser system, a synthetic aperture radar (SAR) system, or others.

Figure 6:
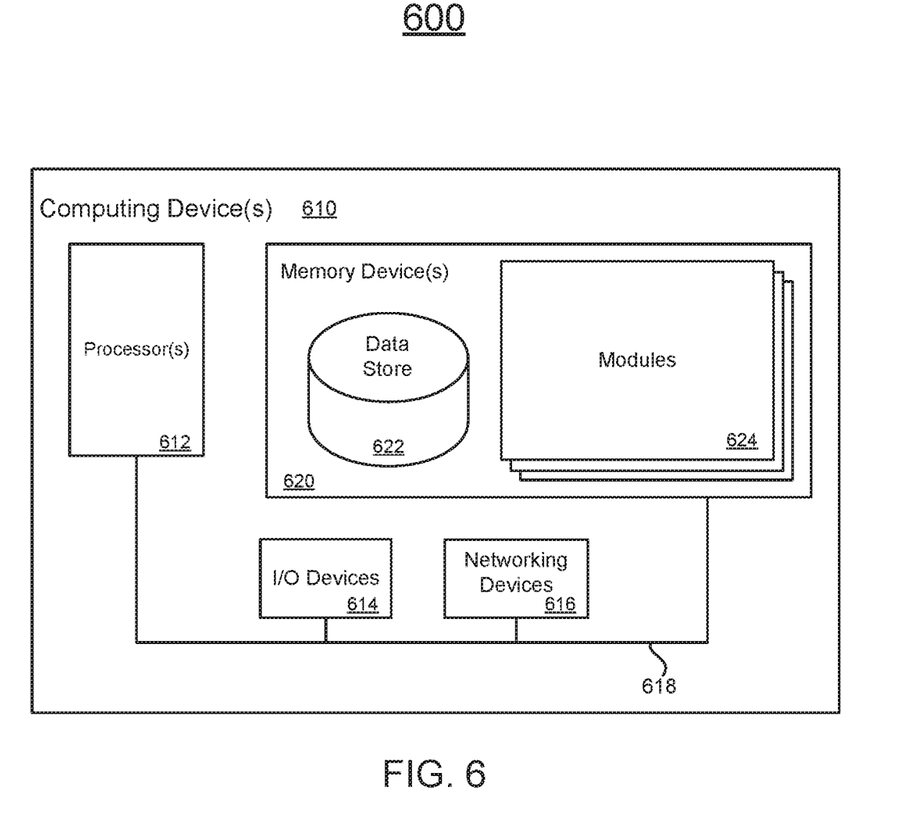
FIG. 6 is a block diagram that provides an example illustration of a computing device that can be employed in the present technology.

FIG. 6 illustrates a computing device 510 (or computing devices) on which modules facilitating the above-described technology can execute. A computing device 510 is illustrated in which examples of the methods and systems described above can be implemented and executed. The computing device 510 can include one or more processors 512 that are in communication with memory devices 520. The computing device can include a local communication interface 517 for the components in the computing device. For example, the local communication interface can be a local data bus and/or any related address or control busses as can be desired.

The memory device 520 can contain modules 524 that are executable by the processor(s) 512 and data for the modules 524. The modules 524 can execute the functions described earlier. A data store 522 can also be located in the memory device 520 for storing data related to the modules 524 and other applications along with an operating system that is executable by the processor(s) 512.

Other applications can also be stored in the memory device 520 and can be executable by the processor(s) 512. Components or modules discussed in this description can be implemented in the form of software using high programming level languages that are compiled, interpreted or executed using a hybrid of the methods.

The computing device can also have access to I/O (input/output) devices 514 that are usable by the computing devices. An example of an I/O device is a display screen that is available to display output from the computing devices. Other known I/O device can be used with the computing device as desired. Networking devices 516 and similar communication devices can be included in the computing device. The networking devices 516 can be wired or wireless networking devices that connect to the Internet, a LAN, WAN, or other computing network.

The components or modules that are shown as being stored in the memory device 520 can be executed by the processor 512. The term "executable" can mean a program file that is in a form that can be executed by a processor 512. For example, a program in a higher level language can be compiled into machine code in a format that can be loaded into a random access portion of the memory device 520 and executed by the processor 512, or source code can be loaded by another executable program and interpreted to generate instructions in a random access portion of the memory to be executed by a processor. The executable program can be stored in any portion or component of the memory device 520. For example, the memory device 520 can be random access memory (RAM), read only memory (ROM), flash memory, a solid-state drive, memory card, a hard drive, optical disk, floppy disk, magnetic tape, or any other memory components.

The processor 512 can represent multiple processors and the memory 520 can represent multiple memory units that operate in parallel to the processing circuits. This can provide parallel processing channels for the processes and data in the system. The local interface 518 can be used as a network to facilitate communication between any of the multiple processors and multiple memories. The local interface 518 can use additional systems designed for coordinating communication such as load balancing, bulk data transfer, and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Furthermore, the described features, structures, or characteristics can be combined in any suitable manner in one or more examples. In the following description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for underwater navigation of an autonomous vehicle (AUV), the method comprising:
obtaining complex return data during an ingress cycle and generating a corresponding complex image of the seabed along the ingress cycle;
obtaining complex return data during an egress cycle and generating a plurality of corresponding complex images of the seabed along the egress cycle;
comparing a local complex image from the egress cycle against the complex image from the ingress cycle;
identifying a normalized cross-correlation coefficient (NCCC) as the local complex image is compared against different portions of the complex image of the ingress cycle; and
identifying a maximum NCCC indicating that a position of the AUV in the along-track direction has been found.

2. The method of claim 1, further comprising:
comparing successive local complex images from the egress cycle against the complex image from the ingress cycle as the AUV moves along the egress path;
identifying successive normalized cross-correlation coefficients (NCCCs) as the successive local complex images are compared against different portions of the complex image of the ingress cycle; and
monitoring the successive NCCCs over time to determine if the successive NCCCs are increasing or decreasing as the AUV moves along the egress path.

3. The method of claim 2, wherein an increasing level in the NCCCs indicates that the egress path of the AUV is converging on the ingress path.

4. The method of claim 2, wherein a decreasing level in the NCCCs indicates that the egress path of the AUV is diverging from the ingress path.

5. The method of claim 2, wherein the comparing successive local complex images from the egress cycle against the complex image from the ingress cycle as the AUV moves along the egress path comprises employing a coherent change detection (CCD) process, and repeating this for the successive local complex images.

6. The method of claim 1, further comprising:
detecting a decrease in the level of NCCCs, and
correcting the egress path of the AUV to increase the level of the NCCCs.

7. The method of claim 1, further comprising:
detecting an increase in the level of the NCCCs, and
maintaining the egress path of the AUV.

8. The method of claim 1, further comprising generating data relating to one or both of depth and altitude of the AUV during both the ingress path and the egress path.

9. The method of claim 8, further comprising, using a vertical sensor, maintaining a depth and an altitude of the AUV during an egress cycle that matches a depth and altitude of the AUV during an ingress cycle.

10. The method of claim 1, further comprising coherently processing the local image and the complex image from the ingress cycle to identify the change in magnitude of the normalized cross-correlation coefficients using one of sonar, radar, synthetic aperture radar (SAR), and laser.

11. A vehicle navigation system comprising:
at least one vertical sensor for measuring a location of the vehicle relative to a ground surface;
a coherence-based monitoring system comprising a sensor system that transmits a signal, and receives a resultant return signal having return data;
a processor operable to receive the return data from the coherence-based monitoring system, and to generate one or more corresponding complex images, wherein the complex images comprise a complex ingress image from an ingress cycle, and at least one complex local image from an egress cycle, the processor further being configured to compare successive complex local images from the egress cycle to the complex ingress image;
a plurality of normalized cross-correlation coefficients (NCCCs) obtained from successive comparison of the complex local images to the complex ingress image, wherein the plurality of NCCCs comprise one of a decreasing level and an increasing level as compared to a maximum NCCC, the maximum NCCC representing an along-track positon of the vehicle; and
propulsion and steering systems operable to alter an egress path of the AUV in the event of a decreasing level of NCCCs, thereby causing the AUV to re-navigate about an ingress path taking during the ingress cycle.

12. The vehicle navigation system of claim 11, wherein the sensor system of the coherence-based monitoring system comprises a sonar system having a sonar transmitter for transmitting the signal as an acoustic sonar signal, and a receiver for receiving the return signal as an acoustic sonar return signal.

13. The vehicle navigation system of claim 11, wherein the sensor system of the coherence-based monitoring system comprises a radar system having a radar transmitter for transmitting the signal, and a receiver for receiving the return signal.

14. The system of claim 11, wherein the sensor system of the coherence-based monitoring system is selected from the group consisting of a sonar system, a laser system, a radar system, a synthetic aperture radar (SAR) system, and any combination of these.

15. The system of claim 11, wherein the vertical sensor comprises at least one of a depth sensor for measuring a depth of the vehicle, and an altitude sensor for measuring an altitude of the vehicle.

16. A method for navigating a vehicle comprising:
with a vehicle, traversing an ingress path during an ingress cycle;
monitoring a ground surface during both the ingress cycle and an egress cycle to generate a plurality of complex images;
comparing successive local complex egress images to one or more reference complex ingress images to obtain successive normalized cross-correlation coefficients (NCCCs),
monitoring the successive NCCCs over time to determine if the successive NCCCs are increasing or decreasing relative to a maximum NCCC as the vehicle moves through the egress cycle;

maintaining the vehicle in as close to an along-track position relative to the ingress path as possible based on the increase or decrease of the successive NCCCs.

17. The method of claim 16, further comprising monitoring a vertical position of the vehicle during the ingress cycle, and maintaining the vertical position of the vehicle during the egress cycle.

18. The method of claim 16, further comprising facilitating selective correction of the egress path of the vehicle during the egress cycle upon a decreasing level of successive NCCCs.

19. The method of claim 16, wherein the monitoring comprises deploying and actuating a sensor system as part of a coherence-based monitoring system.

20. The method of claim 16, wherein the vehicle comprises an autonomous underwater vehicle (AUV), and wherein the monitoring comprises monitoring a seabed using a sonar-type sensor system as part of a coherence-based monitoring system.

* * * * *